(12) United States Patent
Liu et al.

(10) Patent No.: US 12,095,083 B2
(45) Date of Patent: Sep. 17, 2024

(54) CATHODE MATERIALS FOR SECONDARY BATTERIES

(71) Applicant: UCHICAGO ARGONNE, LLC, Chicago, IL (US)

(72) Inventors: Tongchao Liu, Westmont, IL (US); Khalil Amine, Oakbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 302 days.

(21) Appl. No.: 16/809,332

(22) Filed: Mar. 4, 2020

(65) Prior Publication Data
US 2021/0280863 A1    Sep. 9, 2021

(51) Int. Cl.
*H01M 4/505* (2010.01)
*C01G 53/00* (2006.01)
*H01M 4/02* (2006.01)
*H01M 4/36* (2006.01)
*H01M 4/525* (2010.01)
*H01M 4/62* (2006.01)

(52) U.S. Cl.
CPC .......... *H01M 4/505* (2013.01); *C01G 53/50* (2013.01); *H01M 4/366* (2013.01); *H01M 4/525* (2013.01); *H01M 4/62* (2013.01); *C01P 2002/20* (2013.01); *C01P 2002/32* (2013.01); *C01P 2002/52* (2013.01); *C01P 2004/32* (2013.01); *C01P 2004/84* (2013.01); *C01P 2006/40* (2013.01); *H01M 2004/021* (2013.01); *H01M 2004/028* (2013.01)

(58) Field of Classification Search
CPC ...... H01M 4/505; H01M 4/366; H01M 4/525; H01M 4/62; H01M 2004/021; H01M 2004/028; H01M 4/1391; H01M 10/0525; H01M 10/054; H01M 4/131; C01G 53/50; C01P 2002/20; C01P 2002/32; C01P 2002/52; C01P 2004/32; C01P 2004/84; C01P 2006/40; C01P 2004/03; C01P 2004/04; Y02E 60/10
See application file for complete search history.

(56) References Cited

U.S. PATENT DOCUMENTS

| | | | |
|---|---|---|---|
| 9,463,984 B2 | 10/2016 | Sun et al. | |
| 2014/0027670 A1* | 1/2014 | Sun | H01M 4/54 252/182.1 |
| 2016/0260965 A1* | 9/2016 | Wu | H01M 4/366 |
| 2018/0034042 A1* | 2/2018 | Carroll | H01M 4/485 |

FOREIGN PATENT DOCUMENTS

JP     5871186 B2 *  3/2016 ............. C01G 51/04

* cited by examiner

*Primary Examiner* — Daniel S Gatewood
(74) *Attorney, Agent, or Firm* — Foley & Lardner LLP

(57) ABSTRACT

A cathode active material includes a composition expressed as:

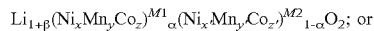

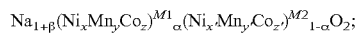

where: M1 represents a core composition comprising of Ni, Mn, and/or Co or a combination of at two of thereof; M2 represents a surface composition having at least 50% Co, and, optionally Ni and/or Mn; the structure of M2 may be a composite structure and includes a rock-salt or disordered rock-salt phase; $0.5 \leq \alpha < 1$, $0 \leq x \leq 1$, $0 \leq y \leq 0.5$, $0 \leq z \leq 1$, $0 \leq x' \leq 0.5$, $0 \leq y' \leq 0.5$, $0.5 \leq z' \leq 1$, and $-0.1 \leq \beta \leq 0.1$; the sum of x, y and z is 0.9-1.1, and the sum of x', y' and z' is 0.9-1.1.

10 Claims, 20 Drawing Sheets

CATHODE MATERIALS FOR SECONDARY BATTERIES

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is generally related to cathode materials for lithium-ion batteries or sodium-ion batteries, and methods to prepare secondary batteries containing the same. More specifically, the present technology is related to particulate cathode materials for lithium/sodium ion batteries, the particles having a concentration gradient along a vector radius of the particles that results in improved electrochemical performance, and suppressing or significantly reducing micro-cracks that are typically generated during repeated lithium- or sodium-ion insertion or desertion.

BACKGROUND

Lithium-ion batteries surpass most other electrochemical energy storage systems in terms of energy density and lifetime. Lithium-ion batteries have achieved unprecedented success in commercialization, specifically in the application of electric vehicles and portable devices. With the ever-growing demand for batteries technology, further development toward higher energy density is predominantly limited by cathode materials.

Nickel-based cathode materials are characterized by high capacity and high power, and they have been considered as the principal candidates for next-generation cathode materials. With high nickel content, the cathodes are of great interest for delivering the desired specific energy and energy density. However, the structural instability of such cathode materials is an impediment to the further development, due to fast capacity decay and low thermal-abuse tolerance. In highly de-lithiated states, i.e. high voltage states, the damage to the cathode materials stems from parasitic side reactions, including the structural degradation, morphological damage, transition metal dissolution, and the oxidization of the organic electrolyte. These side reactions primarily occur on the particle surface and rapidly weaken the cyclability and rate capacity of the system.

Given the significance of commercialization, global efforts have been continuously devoted to exploring effective approaches to enhancing the overall performance of Li[Ni$_x$Mn$_y$Co$_z$]O$_2$ ("NMC")-based electrochemical cells. Among these, a significant breakthrough has been achieved by controlling the local Ni composition of the bulk cathode material, and the surface composition of a single NMC particle to simultaneously improve capacity and structure/thermal stability. For example, see U.S. Patent Publication Nos. 2014/0027670 and 2016/0260965. Several novel structures include core-shell structures and concentration gradient structures. For example, see *Nature Mater.* 2009, 8(4): 320 and *Nature Mater.* 2012, 11(11): 942. In such cathode materials, the particle are designed with a Ni-rich core composition for delivering a high capacity, and Mn-rich surface composition for improving the structural stability. The Ni concentration is reduced from the center to the outer layer of the particle, while the Mn concentration is increased from the center to the outer layer of the particle. The cobalt in most of case remain constant at a low ratio of less than 20%. This approach significantly enhanced the cycle performance and minimized the formation of the cracks when operated at a conventional voltage window (i.e. below 4.4V).

To further improve energy density of batteries, a higher voltage operation inevitably triggers surface side reactions, and structure evolution related to the Ni and Mn components. A combination of surface reactions with the electrolyte, oxygen release, and Mn dissolution accelerates the capacity degradation of NMC cathode. For example, see *Angew. Chem. Int. Ed.* 2015, 54: 4440. In addition, the layered structure of Ni-rich cathodes has been confirmed to be unstable in thermodynamics at high potentials as transition metals (TMs) tend to migrate and form new structures. See *Adv. Energy Mater.* 2018, 8: 1702028. Together, these two factors predominately determine capacity decay mechanisms in Ni-rich materials. Therefore, simultaneously improving the energy density and ensuring the high-voltage functionality of Ni-rich cathodes remains a challenge.

SUMMARY

In one aspect, a cathode active material is provided including: a composition expressed as:

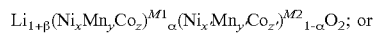

or

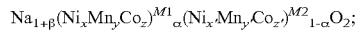

wherein: M1 represents a core composition comprising of Ni, Mn, and/or Co or a combination of at two of thereof; M2 represents a surface composition comprising at least 50% Co, and, optionally Ni and/or Mn; the structure of M2 may be a composite structure and comprises a rock-salt or disordered rock-salt phase; $0.5 \leq \alpha < 1$, $0 \leq x \leq 1$, $0 \leq y \leq 0.5$, $0 \leq z \leq 1$, $0 \leq x' \leq 0.5$, $0 \leq y' \leq 0.5$, $0.5 \leq z' \leq 1$, and $-0.1 \leq \beta \leq 0.1$; and the sum of x, y and z is 0.9-1.1, and the sum of x', y' and z' is 0.9-1.1. In some embodiments, $\beta$ is 0 and the sum of x, y and z and the sum of x', y' and z' are both 1. In any of the above embodiments, the cathode active material comprises a particle having a generally spherical morphology and a vector radius defined thereby. In some embodiments, the composite structure of M2 comprises the rock-salt or disordered rock-salt phase near a surface of the particle, and, optionally, a layered structure and/or a spinel structure nearer a central portion of the particle. In some embodiments, the cathode is characterized as being Ni-rich, where the Ni concentration is constant or partly/continuously decreases along the vector radius, the Mn concentration is constant or partly/continuously decreases or increases nearer the surface of the particle, and the Co concentration continuously increases along the vector radius. In other embodiments, the cathode is Co-rich, where the Co concentration is constant or partly/continuously decreases along the vector radius, the Mn concentration is constant or partly/continuously decreases or increases nearer the surface of the particle, and the Ni concentration continuously increases along the vector radius.

In another aspect, a cathode active material is expressed as $\delta Li_2M1'O_3 \cdot (1-\delta)LiM2'O_2$, wherein M1' comprises one or more of Mn, Ni, and Co; M2' comprises at least 50% Co mol % and a rock-salt or disordered rock-salt phase, and, optionally, Ni and/or Mn, and $0 < \delta < 1$.

In another aspect, a process of preparing a cathode active material is provided, the process including: providing a first aqueous metal ion solution; providing a second aqueous metal ion solution; combining M1 and M2 and with a precipitating agent to form a precipitate; isolating the precipitate; mixing the precipitate with a lithium or sodium salt to form a mixture; and heating-treating the mixture to form the cathode active material that is expressed as: $Li_{1+\beta}(Ni_xMn_yCo_z)^{M1}{}_\alpha(Ni_{x'}Mn_{y'}Co_{z'})^{M2}{}_{1-\alpha}O_2$ or $Na_{1+\beta}(Ni_xMn_yCo_z)^{M1}{}_\alpha(Ni_{x'}Mn_{y'}Co_{z'})^{M2}{}_{1-\alpha}O_2$; where: M1 represents a core composition comprising of Ni, Mn, and/or Co or a combination of at two of thereof; M2 represents a surface composition comprising at least 50% Co, and, optionally Ni and/or Mn; the structure of M2 may be a composite structure and comprises a rock-salt or disordered rock-salt phase; $0.5 \leq \alpha < 1$, $0 \leq x \leq 1$, $0 \leq y \leq 0.5$, $0 \leq z \leq 1$, $0 \leq x' < 0.5$, $0 \leq y' \leq 0.5$, $0.5 \leq z' \leq 1$, $-0.1 \leq \beta \leq 0.1$, the sum of x, y and z is 0.9-1.1, and the sum of x', y' and z' is 0.9-1.1.

BRIEF DESCRIPTION OF THE DRAWINGS

FIG. 6A is at a higher magnification than FIG. 6B.

DETAILED DESCRIPTION

Figure 1:
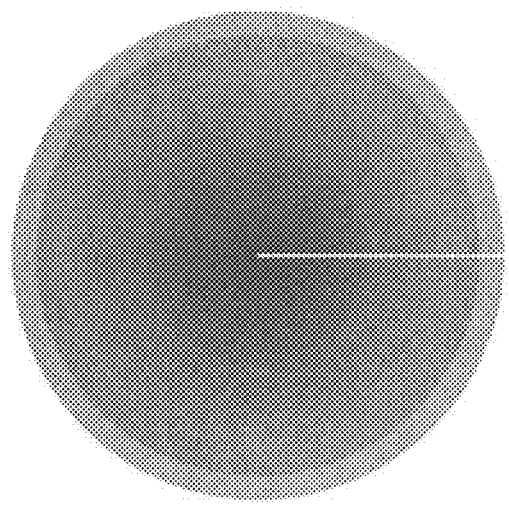
FIG. 1 depicts a transition metal component schematic and graphically a Ni-rich cathode material, which at any given point in the particle, it may be expressed as $Li_{1+\beta}(Ni_xMn_yCo_z)^{M1}{}_\alpha(Ni_{x'}Mn_{y'}Co_{z'})^{M2}{}_{1-\alpha}O_2$, where M1 represents the core composition including Ni, Mn, Co, or a combination of at least two of thereof; M2 represents the surface component consisting of at least 50% Co, and that may contain Ni, and Mn; where $0.5 \leq \alpha < 1$, $0 \leq x \leq 1$, $0 \leq y \leq 0.5$, $0 \leq z \leq 1$, $0 \leq x' \leq 0.5$, $0 \leq y' \leq 0.5$, $0.5 \leq z' \leq 1$, and $-0.1 \leq \beta \leq 0.1$, the sum of x, y and z is 0.9-1.1, the sum of x', y' and z' is 0.9-1.1.
Figure 1:
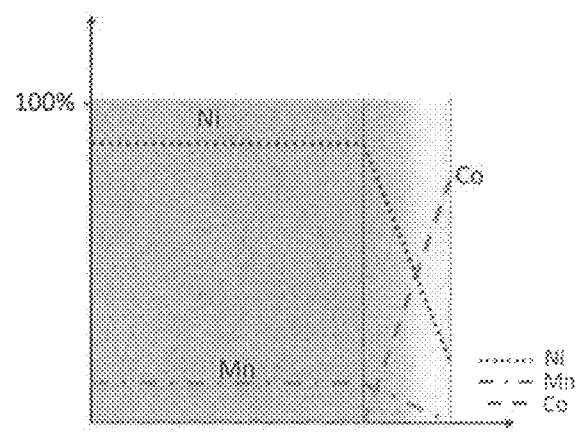

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

To improve the energy density and enhance the high-voltage functionality of layered oxide cathodes, a new strategy is provided for protecting the cathode materials from surficial side reactions and morphology damage, while simultaneously delivering high capacity. A cathode material expressed as a composite structure of $Li_{1+\beta}(Ni_xMn_yCo_z)^{M1}{}_\alpha(Ni_{x'}Mn_{y'}Co_{z'})^{M2}{}_{1-\alpha}O_2$ or $Na_{1+\beta}(Ni_xMn_yCo_z)^{M1}{}_\alpha(Ni_{x'}Mn_{y'}Co_{z'})^{M2}{}_{1-\alpha}O_2$, where M1 represents a core composition of Ni, Mn, Co, or a combination of two or more thereof, M2 represents a surface composition having at least 50% Co, and which may contain Ni and/or Mn; $0.5 \leq \alpha < 1$, $0 \leq x \leq 1$, $0 \leq y \leq 0.5$, $0 \leq z \leq 1$, $0 \leq x' \leq 0.5$, $0 \leq y' \leq 0.5$, $0.5 \leq z' \leq 1$, and $-0.1 \leq \beta \leq 0.1$, the sum of x, y and z is 0.9-1.1, the sum of x', y' and z' is 0.9-1.1. In general, the cathode may be Ni-rich, but the Ni concentration is constant and then decreases nearer the surface of the particle, the Mn concentration is constant and then decreases nearer the surface of the particle, and the Co concentration is constant and then increases nearer the surface of the particle. When the cathode is Co-rich component, the Co concentration may be constant or partly/continuously decreased along the vector radius, the Mn concentration is constant or partly/continuously decreases/or increases nearer the surface of the particle, and the Ni concentration continuously increases along the vector radius. In general, the sum of x, y, and z will be about 1, and the sum of x', y', and z' will be about 1, however lithium rich or lithium deficient structures may provide a wider range for these sums.

In some embodiments, the Co is present at about 90 mol % at or near the surface of the particle. In some embodiments, the Co is present at about 70 mol % at or near the surface of the particle. The cathode material is characterized by a concentration of M1 that is constant or partly/continuously decreased along a vector radius of the particle and where the concentration of M2 continuously increases along the vector radius. The cathode material is characterized in that the composite structure of M2 is composed of at least a rock-salt or disordered rock-salt phase and may include a layered structure and a spinel structure, wherein the structure may gradually change in morphology from a layered structure toward the center of the particle to a rock-salt or disordered rock-salt phase nearer the surface of the particle. The rock-salt or disordered rock-salt phase may crystallize in the Fm-3m space group and other space groups, the layered structure may crystallize in the R-3m space group and other space groups, and the spinel structure may crystallize in the Fd-3m space group and other space groups.

As used herein the term "vector radius" is used to show a directionality of the radius of the particle from the center to the surface. The particles are generally spherical and thus characterized by the vector radius, however even where the particles do not have a general spherical shape or an irregular spherical or oblate spheroid shape, the radius may be approximated as any radial measurement from a mean center to a surface. In particular, and differing from prior art concentration gradient cathodes, the newly designed concentration gradient cathode mainly controls the distribution of Co in the whole particle, rather than that of Ni.

Further, although the terms "core solution" or "core composition" and "surface solution" or "surface composition" are used herein, they do not refer to a traditional meaning of core and surface. The core solution is the solution that forms the bulk of, or all of, the initial particle nucleation, however as the particle forms and the "surface" solution is mixed with the "core" solution, a gradient concentration in at least one of the metals is established within the growing particle to the point where the particle is nearly complete and the "surface" solution now form the bulk of, or all of, the final materials that deposit as part of the particle.

As used herein, the term "surface" of the particle, may refer to the region of the particle that is nearing the outer most reaches of the particle and may include the final 0.2 μm of the solid material in the particle.

As used herein, a "spinel" structure refers to a class of minerals of general formulation AB2X4 which crystallize in the cubic crystal system and may crystallize Fd-3m space group, and other space group. Its phase or structure is determined that the X anions (typically chalcogens, like oxygen and sulfur) arranged in a cubic close-packed lattice, and the cations A and B occupying some or all of the octahedral and tetrahedral sites in the lattice.

As used herein, a "rock salt" structure refers to a class of materials which crystallize in the cubic space system and may crystallize in Fm-3m space group, and other space groups. Its phase or structure is determined that each of the two atom types forms a separate face-centered cubic lattice, with the two lattices interpenetrating so as to form a 3D checkerboard pattern. A "disorder rock-salt" structure refers to a rock salt structure with structure defects that include cation vacancy, anion vacancy, and cation mixing.

A Li-rich and Mn-rich cathode material expressed as $\delta Li_2M1'O_3 \cdot (1-\delta)LiM2'O_2$ wherein M1' is one or more metal ions of Ni, Mn, and Co; M2' has at least 50 mol % Co and may, optionally, include Ni and/or Mn, and where $0 < \delta < 1$. In some embodiments, the Co is present at about 70 mol % at or near the surface of the particle. The cathode material may be characterized in that the composite structure of M2' is composed of at least a rock-salt or disordered rock-salt phase near the surface of the particle, and may include a layered structure and/or a spinel structure near the center of the particle or along the vector radius of the particle. The cathode material may be characterized by a concentration of M1 that is constant or partly/continuously decreased along the vector radius, while the concentration of M2 continuously increases along the vector radius.

In some embodiments, the cathode material represents a Ni-rich component expressed by $Li_{1+\beta}(Ni_xMn_yCo_z)^{M1}{}_\alpha(Ni_{x'}Mn_{y'}Co_{z'})^{M2}{}_{1-\alpha}O_2$, where M1 represents the core composition and M2 represents the surface composition, and where $0.8 \leq \alpha < 1$, $0.6 \leq x \leq 1$, $0 \leq y \leq 0.4$, $0 \leq z \leq 0.4$, $0 \leq x' \leq 0.5$, $0 \leq y' \leq 0.5$, $0.5 \leq z' \leq 1$, and $-0.1 \leq \beta \leq 0.1$, the sum of x, y and z is 0.9-1.1, and the sum of x', y' and z' is 0.9-1.1. In some embodiments, β is 0. In any embodiments, the Ni concentration constant or partly/continuously decreases along the vector radius, the Mn concentration is constant or partly/continuously decreases nearer the surface of the particle, and the Co concentration partly/continuously increases along the vector radius. The cathode material may be characterized in that the composite structure of M2 is composed of at least a rock-salt phase and may include a layered structure and/or a spinel structure.

In some embodiments, the cathode material represents a Co-rich component expressed as $Li_{1+\beta}(Ni_xMn_yCo_z)^{M1}{}_\alpha(Ni_{x'}Mn_{y'}Co_{z'})^{M2}{}_{1-\alpha}O_2$, where M1 represents the core composition and M2 represents the surface composition, and where $0.8 \leq \alpha < 1$, $0 \leq x \leq 0.2$, $0 \leq y \leq 0.2$, $0.8 \leq z \leq 1$, $0 \leq x' \leq 0.5$, $0 \leq y' \leq 0.5$, $0.5 \leq z' \leq 1$, $-0.1 \leq \beta \leq 0.1$, the sum of x, y and z is 0.9-1.1, and the sum of x', y' and z' is 0.9-1.1. In some embodiments, the Co is present at about 90 mol % at or near the surface of the particle. In some embodiments, the Co is present at about 70 mol % at or near the surface of the particle. The Co concentration is constant or partly/continuously decreases along the vector radius, the Mn concentration is constant or partly/continuously decreases/or increases nearer the surface of the particle, and the Ni concentration continuously increases along the vector radius. The cathode material may be characterized in that the composite structure of M2 is composed of at least a rock-salt or disordered rock-salt phase and may include a layered structure and/or a spinel structure.

In any embodiments, the surface composition includes more than 50 mol % Co, and gradually increases going toward the surface. In some embodiments, the surface composition includes more than about 60 mol % Co. In some embodiments, the surface composition includes more than about 70 mol % Co. In some embodiments, the surface composition includes from about 60 mol % to about 90 mol % Co. In some embodiments, the surface composition includes from about 60 mol % to about 75 mol % Co. In any of the above embodiments, the surface structure may be a composite structure that includes a rock-salt or disordered rock-salt phase.

In any embodiments where the concentration of M1 in the gradient cathode decreases, it could be through one slope or more (i.e. one or more concentration rate changes). Where the concentration of M2 increases in the gradient cathode, it could be using one slope or more.

The cathode materials may further include a dopant cation, T or T', such that the overall formula may be expressed as $Li_{1+\beta}(Ni_xMn_yCo_zT_\delta)^{M1}{}_\alpha(Ni_{x'}Mn_{y'}Co_{z'}T'_{y'})^{M2}{}_{1-\alpha}O_2$ or $Na_{1+\beta}(Ni_xMn_yCo_zT_\delta)^{M1}{}_\alpha(Ni_{x'}Mn_{y'}Co_{z'}T'_{y'})^{M2}{}_{1-\alpha}O_2$, where T and T' are an alkaline earth metal or a transition metal other than Ni, Mn, and Co, or a combination of any two or more thereof, where $0 \leq \delta \leq 0.1$, $0 \leq y \leq 0.1$, $0.5 \leq \alpha < 1$, $0 \leq x \leq 1$, $0 \leq y \leq 0.5$, $0 \leq z \leq 1$, $0 \leq x' \leq 0.5$, $0 \leq y' \leq 0.5$, $0.5 \leq z' \leq 1$, $-0.1 \leq \beta \leq 0.1$, the sum of x, y and z is 0.9-1.1, and the sum of x', y' and z' is 0.9-1.1. The dopant may, in some embodiments, be Ca, Ti, Cr, V, Fe, Cu, Zn, Zr, Nb, Mo, Ru, Ir, La, W, Sn, Sb, or a mixture of any two or more thereof. These dopant may be present in a constant concentration along the vector radius of the particle (i.e. particle doping), or be present only at the surface of the particle (i.e. surface doping).

The cathode materials may include coating layer over/around the particle. Illustrative coating materials include, a metal oxide such as $MgO$, $Al_2O_3$, $ZrO_2$, $MnO_2$, $CeO_2$, $TiO_2$, $ZnO$, $SiO_2$, $SnO_2$, or $Cr_2O_3$; a metal fluoride such as $AlF_3$, $CaF_2$, $CeF_3$, $ZrF$, $ZrF_2$, $ZrF_3$, $ZrF_4$, $LaF_3$, or $SrF_2$; a metal phosphate such as $Li_3PO_4$, $AlPO_4$, $YPO_4$, $Li_3PO_4$, $FePO_4$, $Mg_3(PO_4)_2$, $Zn_3(PO_4)_2$, $Ca_3(PO_4)_2$, $Co_3(PO_4)_2$, or $Ni_3(PO_4)_2$; a conductive carbon coating based upon polyacetylenes, polypyrroles, polyparaphenylenes, polythiophene, polyfurans, polythianaphthenes, polyanilines, poly(3,4-ethylenedioxythiophene) ("PEDOT") and their derivatives or copolymers; or a combination of any two or more thereof.

In other aspect, an electrochemical device is provided that includes the cathode active materials as described above. In some embodiments, the electrochemical device may be a lithium ion battery or a sodium ion battery. Such batteries include a cathode including the cathode active materials, an anode, a separator existing between the cathode and anode, and an electrolyte, which is immersed in the cathode, the anode, and the separator.

Illustrative anode materials are those that can reversibly absorb or release lithium or sodium ions. The materials may include artificial graphite, natural graphite, and graphitized carbon fiber amorphous carbon. Lithium metal also can be used as an anode active material. The electrolyte may be a liquid electrolyte containing a lithium salt, a non-aqueous organic solvent, and/or a polymer gel.

In another aspect, provided are methods for preparing the cathode materials. Generally, the methods include preparation of the core and surface solutions. The materials are then introduced to a reactor where, by adjusting flow rates, the particles with a gradient concentration of the metals as described above, may be formed as precursor materials by precipitating from the core and/or surface solutions with the addition of a precipitating agent and a chelating agent. By way of further explanation, first, M1 and M2 solutions are prepared for core composition solution and the surface composition solution, respectively. The core solution may contain an appropriate ratio of Ni, Mn and Co; and the surface solution contains at least 50 mol % Co, and may contain Ni and/or Mn as well. The M1 solution for the core and the M2 solution for the surface may be prepared by adding a nickel salt, cobalt salt, and manganese salt to a solvent, or they may be prepared by preparing aqueous solution containing the nickel salt, cobalt salt, and manganese salt, respectively followed by mixing. The M1 and M2 solutions may be prepared using a salt of oxalic acid, nitric acid, sulfuric acid, hydrochloric acid, or a combination of thereof, which can be dissolved in water or other solvents, without particular limitation. The concentrations of M1 and M2 may be the same or different from 0.1 M to 10.0 M. This concentration range includes 0.1 M, 0.2 M, 0.3 M, 0.4 M, 0.5 M, 1.0 M, 1.5 M, 2.0 M, 2.5 M, 3.0 M, 3.5 M, 4.0 M, 4.5 M, 5.0 M, 6 M, 7 M, 8 M, 9 M, 10 M and the appropriate ratio within this range. The solutions, in two different tanks, are pumped to a reactor by appropriate time and proportion, wherein a chelating agent and metal salt solution are added by the appropriate proportion, a precipitant agent is pumped into the reactor simultaneously to obtain a precipitate with a part or continuous gradient concentration. The precipitate so produced is referred to as the "precursor," because it will then be mixed with a lithium or sodium source, heat-treated to form the oxides, and the oxides are then recovered as the cathode active material. The gradient concentration refers to the fact that two or more elements exhibit concentration changes in part/whole along a vector radius of the particle.

Illustrative chelating agents include, but are not limited to, an ammonia salt or a salt containing ammonium ions such as ammonium sulfate or ammonium nitrate, or a combination of thereof. The concentration of chelating agent may vary from 0.1 M to 10 M. This includes concentrations of about 0.5 M, 1.0 M, 1.5 M, 2.0 M, 2.5 M, 3.0 M, 3.5 M, 4.0 M, 4.5 M, 5.0 M, 6.0 M, 7.0 M, 8.0 M, 9.0 M, 10 M, and the appropriate amounts within these ranges. A ratio of chelating agent to transition metal solution, on a mol basis, may also vary from 0.1 to 5, and may be 0.1, 0.2, 0.3, 0.4, 0.5, 0.6, 0.7, 0.8, 0.9, 1, 1.5, 2, 2.5, 3, 3.5, 4, 4.5, 5, or an appropriate concentration within this range.

Illustrative precipitating agents include, but are not limited to, sodium hydroxide, sodium carbonate, and sodium oxalate. A concentration of precipitant agent in the solution to be added may vary from about 0.1 M to about 10 M. This may include concentrations of about 0.5 M, 1.0 M, 1.5 M, 2.0 M, 2.5 M, 3.0 M, 3.5 M, 4.0 M, 4.5 M, 5.0 M, 6.0 M, 7.0 M, 8.0 M, 9.0 M, 10 M, or an appropriate concentration within this range. The precipitating agent in the reactor may be controlled by pH, and the pH may be from about 9 to about 12, defined at room temperature. The pH, in various embodiments, may be 9.0, 9.5, 10.0, 10.5, 11.0, 11.5, 12.0, or an appropriate value within this range.

After synthesis, the precipitate is washed and dried and may be stored under an atmosphere of a protective gas before being heat treated to form the cathode active material. Illustrative protective gases include, but are not limited to, $N_2$, He, Ar, Xe, and Kr.

Thus, in some embodiments, the method of forming the particles includes mixing a precursor and a lithium salt or a sodium salt in an appropriate ratio, and heat-treating at a temperature of about 300° C. to about 1200° C. The precursor refers to a hydroxide or carbonate (($Ni_aMn_bCo_c$)$(OH)_{2+d}$ or ($Ni_aMn_bCo_c$)$CO_3$) containing a suitable proportion of Ni, Mn, and Co that can be converted to $LiNi_aMn_b$-$Co_cO_2$ when reacting with Li and followed by heat treating (i.e. a calcination as in other preparative procedures for lithium nickel manganese cobalt oxides. Illustrative lithium salts include, but are not limited to, LiOH, $Li_2CO_3$, $LiNO_3$, LiCl, LiF, LiBr, LiI, $Li_2O$, or a mixture of any two or more thereof. Illustrative sodium salts include, but are not limited to, NaOH, $Na_2CO_3$, $NaNO_3$, NaCl, NaF, NaBr, NaI, $Na_2O$, or a mixture of any two or more thereof. A ratio of the lithium or sodium salt and the metal of the precursor may vary from about 0.9 to about 1.1 on a mol basis. This may include values of about 0.9, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, and appropriate ratios within this range. The heat-treating may include pre-sintering at the temperature of about 300° C. to about 600° C., maintaining this temperature for about 2 to about 10 hours, and then sintering at about 680° C. to about 1200° C. for about 5 to about 30 hours. The sintering atmosphere may be selected from oxygen, air, or a combination of thereof.

The present invention, thus generally described, will be understood more readily by reference to the following examples, which are provided by way of illustration and are not intended to be limiting of the present invention.

EXAMPLES

Example 1. FIG. 1. Illustrates a transition metal component schematic of a cathode active material that may be expressed as $Li_{1+\beta}(Ni_xMn_yCo_z)^{M1}{}_\alpha(Ni_xMn_yCo_{z'})^{M2}{}_{1-\alpha}O_2$, wherein M1 represents the core composition of Ni, Mn, Co, or a combination of at least two of thereof, M2 represents the surface component consisting of Ni, Mn, Co. or a combination of at least two of thereof; $0.5 \leq \alpha < 1$, $0 \leq x \leq 1$, $0 \leq y \leq 0.5$, $0 \leq z \leq 1$, $0 \leq x' \leq 0.5$, $0 \leq y' \leq 0.5$, $0.5 \leq z' \leq 1$, and $-0.1 \leq \beta \leq 0.1$, the sum of x, y and z is selected in the range of 0.9-1.1, the sum of x', y' and z' is selected in the range of 0.9-1.1. The Ni concentration constant or partly/continuously decreases along the vector radius, the Mn concentration is constant or partly/continuously decreases nearer the surface of the particle (or along the vector radius), and the Co concentration partly/continuously increases along the vector radius. The cathode material is characterized in that the composite structure of M2 is composed of a rock-salt or disordered rock-salt phase that may also include a layered structure and/or a spinel structure, where the structure across the gradient becomes a rock-salt or disordered rock-salt phase near the surface. FIG. 1 depicts the core component (M1) of the cathode as having a high Ni content and the surface component as having a high Co content, wherein the core contains at least 50 mol % Ni that may contain Mn and Co; while the surface component contains at least 50 mol % Co and which may contain Ni and Mn. In addition, the surface structure may be integrated. The surface of the particles may also include the rock-salt or disordered rock-salt phase.

Example 2. The preparation of a cathode active material expressed as $Li_{1+\beta}(Ni_xMn_yCo_z)^{M1}{}_\alpha(Ni_{x'}Mn_{y'}Co_{z'})^{M2}{}_{1-\alpha}O_2$, wherein M1 represents the core composition including Ni, Mn, Co, or a combination of at least two of thereof; M2 represents the surface component including Ni, Mn, Co, or a combination of at least two of thereof; $0.8 \leq \alpha < 1$, $0.6 \leq x \leq 1$, $0 \leq y \leq 0.4$, $0 \leq z \leq 0.4$, $0 \leq x' \leq 0.5$, $0 \leq y' \leq 0.5$, $0.5 \leq z' \leq 1$, and $-0.1 \leq \beta \leq 0.1$, the sum of x, y and z is selected in the range of 0.9-1.1, the sum of x', y' and z' is selected in the range of 0.9-1.1. The cathode material is characterized by a Ni-rich component, the Ni is concentration constant or partly/continuously decreases along the vector radius, the Mn concentration is constant or partly/continuously decreases/or increases nearer the surface of the particle (or along the vector radius), and the Co concentration continuously increases along the vector radius.

A representative of the Ni-rich $Li_{1+\beta}(Ni_xMn_yCo_z)^{M1}{}_\alpha$ $(Ni_{x'}Mn_{y'}Co_{z'})^{M2}{}_{1-\alpha}O_2$ is described below. In a co-precipitation synthesis, the concentration gradient precursor was prepared from two metal solutions. The solution for preparing the core component contained Ni and Mn at a ratio of 89:11 on a mol basis. The solution for preparing the surface component contained only Co. The concentration of two metal solutions was 2 M and was prepared with the corresponding sulfate salts of the metals. A volume ratio of the two metal solutions was 90:10, and the volume of two metal solutions in total was 1.0 L.

An initial chelating agent was prepared by mixing 1.2 L purified water and 300 ml of 5 M ammonia (aq) solution, and then placed into a co-precipitation reactor. The reaction temperature was set at 60° C., the rotation speed was set at 1000 rpm, and nitrogen gas was used as a purge and environmental gas for the synthetic process.

The aqueous metal solutions for the core and surface compositions mixed at a volume ratio of 90:10. The metal solution for the core was directly injected into a 4 L reactor at 0.04 L/hour, 5 M ammonia solution was continuously injected into the reactor at the rate of 0.02 L/hour. The content of the precipitant agent, NaOH, was controlled by pH value. A 5 M NaOH(aq) solution was supplied to maintain the pH in the reactor at 11. After consuming about 80% the core solution, the metal solution for the surface composition was injected into, and mixed with, the core solution at the rate of 0.04 L/hour. During the synthetic process, a stirring speed of the reactor was kept at 1000 rpm, and the reaction temperature was set at 60° C. The co-precipitation reaction was conducted for about 20 hours. Thereafter, the precipitant was maintained at the steady state for 4 hours to obtain a co-precipitated compound with higher density. The compound was then collected by filtration, washed with water, and dried at 110° C. with nitrogen gas for 15 hours to obtain a cathode material precursor.

The precursor was then mixed with lithium hydroxide at a wt ratio of 1:1.03, and then heated to 450° C. at a rate of 2° C./min, and finally maintained at 450° C. for 5 hours followed by calcining at 750° C. for 12 hours to obtain a final cathode material particle.

Figure 2:
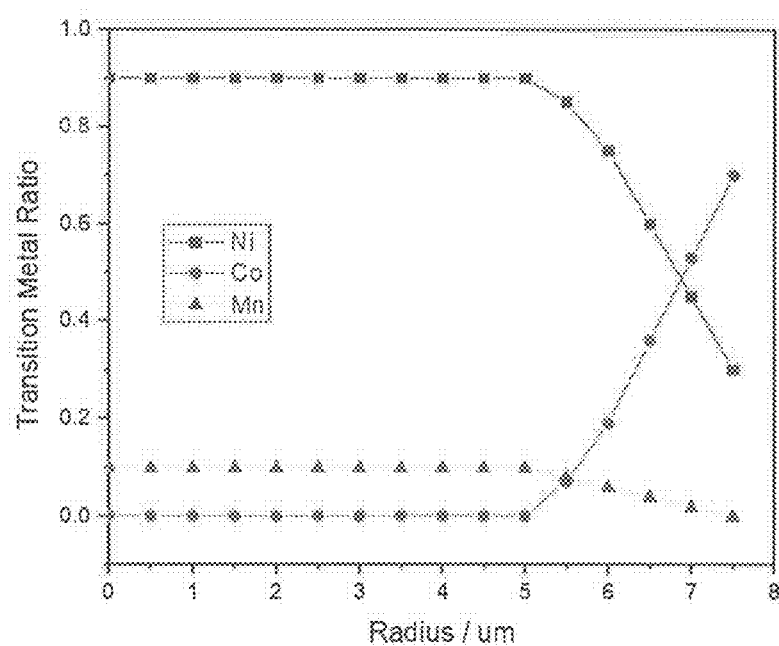
FIG. 2 depicts a representative concentration profile for a cathode material expressed as $Li_{1+\beta}(Ni_xMn_yCo_z)^{M1}{}_\alpha(Ni_xMn_yCo_z)^{M2}{}_{1-\alpha}O_2$, wherein the Ni concentration is constant in the core and decreases to 30% in the surface; the Mn concentration is constant in the core and decreases to 0 at the surface; and the Co concentration is absent in the core and increases to 70% at the surface.

According to the synthetic process, a typical representative concentration of Example 2 is shown in FIG. 2. As shown, the Ni concentration is constant in the core portion and then quickly decreases to 30% at the surface; the Mn concentration is constant in the core part and then quickly decreases to 0 in the surface; and the Co concentration is absent in the core part and then increases from 0 to 70% in the surface.

Example 3. A representative of the Ni-rich $Li_{1+\beta}(Ni_xMn_yCo_z)^{M1}{}_\alpha(Ni_xMn_yCo_z)^{M2}{}_{1-\alpha}O_2$ with two-slope concentration gradient is described below. In a co-precipitation synthesis, the concentration gradient precursor was prepared by two metal solutions. The solution for preparing the core component contains Ni, Co, and Mn at a mol ratio of 92:2:6; and the solution for preparing the surface component contains Ni, Co, and Mn at a mol ratio of 30:70:0 the concentration of two metal solutions is 2 M and prepared with the corresponding sulfate salts; the volume ratio of two metal solutions is 80:20; and the volume of two metal solutions in total is 1.0 L.

The initial chelating agent is prepared by mixing 1.2 L purified water and 300 ml 5 M aqueous ammonia solution, and then placing it into a co-precipitation reactor. The reaction temperature was set at 60° C., the rotation speed was set at 1000 rpm, and nitrogen gas protection was applied to the process.

The metal aqueous solution for preparing the core and metal aqueous solution for preparing the surface part were mixed at a volume ratio of 80:20. The metal solution for the core was directly injected into the 4 L reactor at 0.04 L/hour, and simultaneously the metal solution for surface was injected into the core solution at the rate of 0.005 L/hour. Further, a 5 M ammonia solution was continuously injected into the reactor at the rate of 0.02 L/hour. Further, the content of the precipitating agent, NaOH, was controlled by pH value. A 5 M NaOH aqueous solution was supplied to maintain pH in the reactor at 11. After consuming 50 vol % of the surface solution, the metal solution for surface part was injected into the core solution at the rate of 0.04 L/hour. In the synthetic process, the stirring speed of the reactor was kept at 1000 rpm, and the reaction temperature was set at 60° C. The co-precipitation reaction was conducted for about 20 hours, thereafter, the precipitant was kept at a steady state for 4 hours to obtain a co-precipitated compound with higher density. The compound was then filtered, washed with water, and dried with 110° C. with nitrogen gas for 15 hours to obtain a cathode active material precursor.

The precursor was mixed with lithium hydroxide at a mol ratio of 1:1.03, and then heated to 450° C. at a rate of 2° C./min, and then maintained at 450° C. for 5 hours followed by calcining at 750° C. for 12 hours to obtain a final cathode material particle.

Figure 3:
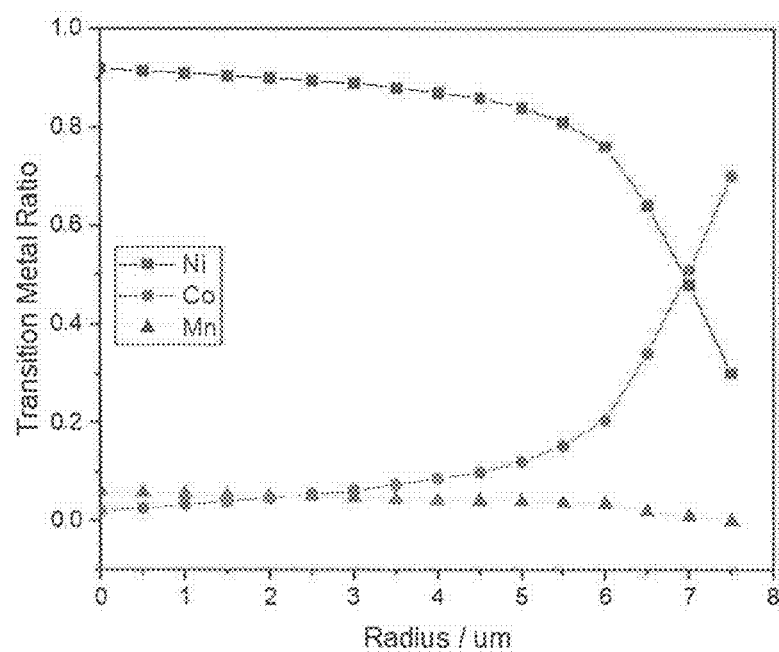
FIG. 3 depicts a representative concentration profile for a cathode material expressed as $Li_{1+\beta}(Ni_xMn_yCo_z)^{M1}{}_\alpha(Ni_xMn_yCo_z)^{M2}{}_{1-\alpha}O_2$ with a two-slope concentration gradient, wherein the Ni concentration decreases in the core and decreases to 30% at the surface; the Mn concentration decreases in the core and decreases to 0 at the surface; and the Co concentration increases in the core and increases to 70% at the surface.

According to the synthetic process, a typical representative concentration of Example 2 is shown in FIG. 3. The Ni concentration slowly decreases in the core and then quickly decreases to 30% at the surface; the Mn concentration slowly decreases in the core part and then quickly decreases to 0 in the surface; and the Co concentration slowly increases in the core part and then sharply increases to 70% in the surface.

Figure 4:
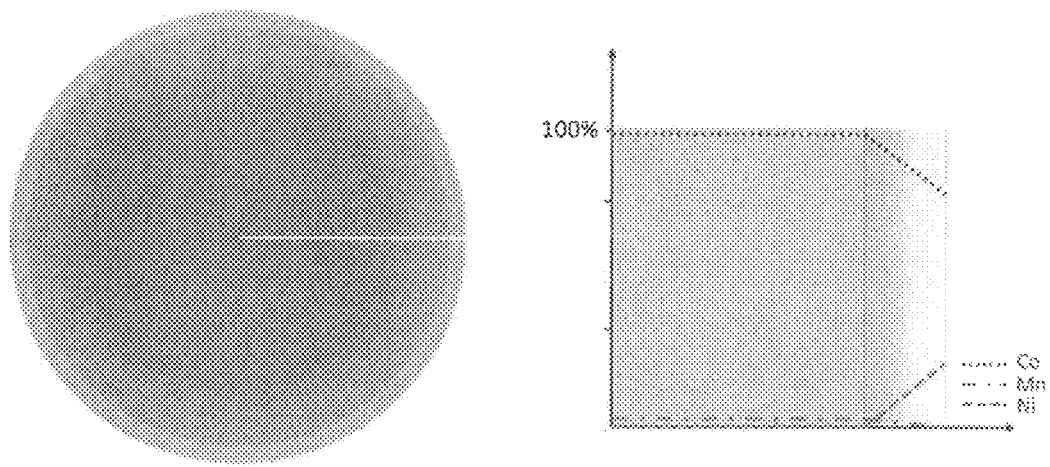
FIG. 4 depicts a transition metal component schematic of a Co-rich cathode material expressed as $Li_{1+\beta}(Ni_xMn_yCo_z)^{M1}{}_\alpha(Ni_{x'}Mn_{y'}Co_{z'})^{M2}{}_{1-\alpha}O_2$, wherein M1 represents the core composition of Ni, Mn, Co, or a combination of at least two of thereof; M2 represents the surface component of Ni, Mn, Co, or a combination of at least two of thereof, and where $0.9 \leq \alpha < 1$, $0 \leq x \leq 0.2$, $0 \leq y \leq 0.2$, $0.8 \leq z \leq 1$, $0 \leq x' \leq 0.5$, $0 \leq y' \leq 0.5$, $0.5 \leq z' \leq 1$, and $-0.1 \leq \beta \leq 0.1$, the sum of x, y and z is 0.9-1.1, the sum of x', y' and z' is 0.9-1.1. The cathode is characterized by a Co-rich component in general; the Co concentration constant or partly/continuously decreases along the vector radius, the Mn concentration is constant or partly/continuously decreases or increases nearer the surface of the particle, and the Ni concentration continuously increases along the vector radius of the particle.

Example 4. FIG. 4 depicts a transition metal component schematic of the cathode material expressed as $Li_{1+\beta}(Ni_xMn_yCo_z)^{M1}{}_\alpha(Ni_{x'}Mn_{y'}Co_{z'})^{M2}{}_{1-\alpha}O_2$, wherein M1 represents the core composition of Ni, Mn, Co, or a combination of at least two of thereof, M2 represents the surface component of Ni, Mn, Co, or a combination of at least two of thereof, where $0.9 \leq \alpha < 1$, $0 \leq x \leq 0.2$, $0 \leq y \leq 0.2$, $0.8 \leq z \leq 1$, $0 \leq x' \leq 0.5$, $0 \leq y' \leq 0.5$, $0.5 \leq z' \leq 1$, and $-0.1 \leq \beta \leq 0.1$, the sum of x, y and z is selected in the range of 0.9-1.1, the sum of x', y' and z' is selected in the range of 0.9-1.1. The cathode is characterized by a Co-rich component in general. The Co concentration is constant or partly/continuously decreases along the vector radius, the Mn concentration is constant or partly/continuously decreases/or increases nearer the surface of the particle (or along the vector radius), and the Ni concentration continuously increases along the vector radius.

A representative example of the Co-rich $Li_{1+\beta}(Ni_xMn_yCo_z)^{M1}{}_\alpha(Ni_{x'}Mn_{y'}Co_{z'})^{M2}{}_{1-\alpha}O_2$ is described below. In a co-precipitation synthetic method, the concentration gradient precursor was prepared from two metal solutions. The solution for preparing the core component contains Co and Mn at a mol ratio of 98:2; and the solution for preparing the surface component contains Co and Ni at a mol ratio of 70:30; the concentration of the two metal solutions was 2 M and prepared with the corresponding sulfate salt; where the volume ratio of the two metal solutions is 90:10, and the volume of two metal solutions in total was 1.0 L.

The initial chelating agent was prepared by mixing 1.2 L purified water and 300 ml 5 M aqueous ammonia solution, and then charged to a co-precipitation reactor. The reaction temperature was set at 60° C., the rotation speed was set at 1000 rpm, and nitrogen gas protection was applied to the process.

The aqueous metal solutions for preparing the core and surface compositions were mixed in a volume ratio of 90:10. The metal solution for the core was directly injected into the 4 L reactor at 0.04 L/hour, and 5 M ammonia solution was continuously injected into the reactor at the rate of 0.02 L/hour. Further, the precipitating agent, NaOH, was controlled by pH value. A 5 M NaOH aqueous solution was supplied to maintain the pH in the reactor at 11. After consuming 80 vol % of the core solution, the metal solution for the surface composition was initiated into the reactor and mixed with the core solution at the rate of 0.04 L/hour. In the synthetic process, the stirring speed of the reactor was kept at 1000 rpm, and the reaction temperature was set at 60° C. The co-precipitation reaction was conducted around 20 hours; afterward, the precipitant was maintained at steady state for 4 hours to obtain a co-precipitated compound with higher density. The compound was then filtered, washed with water, and dried at 110° C. with nitrogen gas for 15 hours to obtain a cathode active material precursor.

The precursor was mixed with lithium hydroxide at a mol ratio of 1:1.03, and then heated to 500° C. at a rate of 2° C./min, and then maintained at 450° C. for 5 hours followed by calcining at 900° C. for 12 hours to obtain a final cathode material particle.

Figure 5:
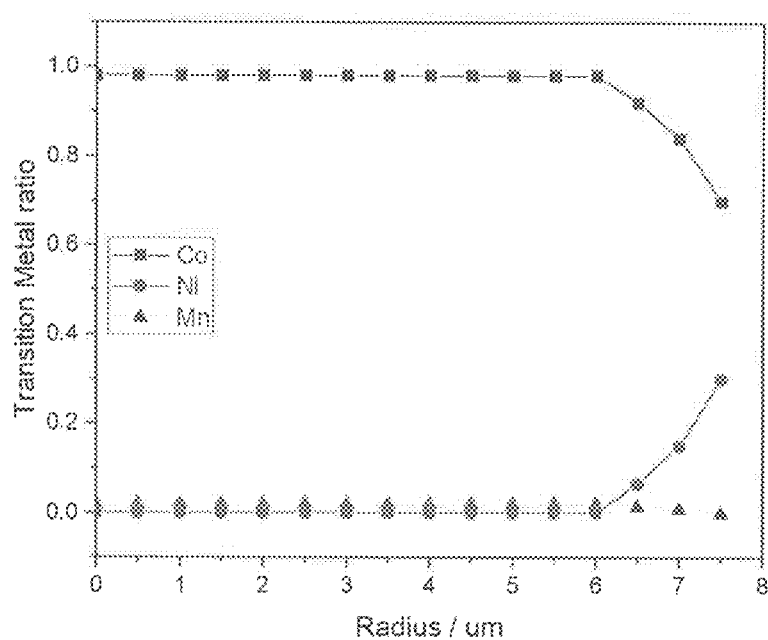
FIG. 5 depicts a representative concentration profile for a cathode material expressed as $Li_{1+\beta}(Ni_xMn_yCo_z)^{M1}{}_\alpha(Ni_xMn_yCo_z)^{M2}{}_{1-\alpha}O_2$, wherein the Co concentration is constant in the core and decreases to 70% at the surface; the Mn concentration is constant in the core and decreases to 0 at the surface; and the Ni concentration is absent in the core and then increases from 0 to 30% at the surface.

According to the synthesis process, a typical representative concentration of example 4 is shown in FIG. 5. The Co concentration was constant in the core and then quickly decreased to 70 mol % at the surface; the Mn concentration is constant in the core part and then quickly decreased to 0 mol % at the surface; and the Ni concentration is absent in the core part and then increased from 0 mol % to 30 mol % at the surface.

Figure 6A:
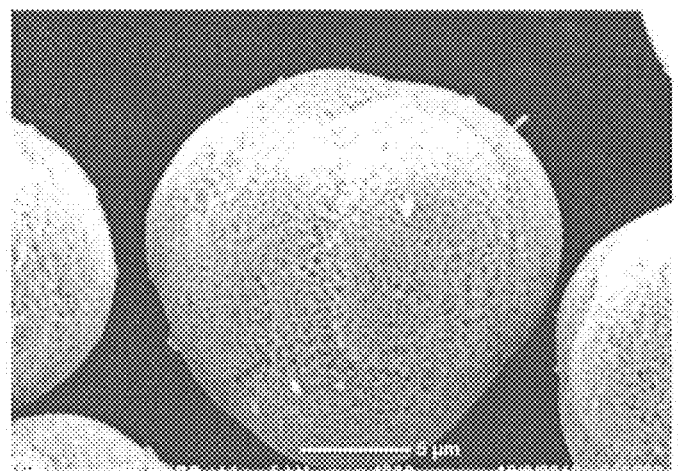
FIGS. 6A and B depict scanning electron microscopy images of the Example 2 Ni-rich precursor and having a spherical and uniform particle size with an average size of about 12 m.
Figure 6B:
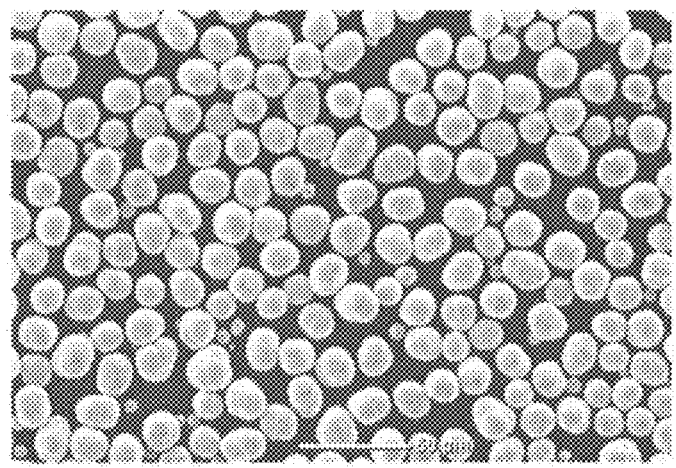

Example 5. The morphological characterization of the precursor for Example 2. The scanning electron microscopy (SEM) images of Example 2 are shown in FIGS. 6A and 6B. The precursor shows a uniform particle size with an average size of about 12 μm.

Figure 7A:
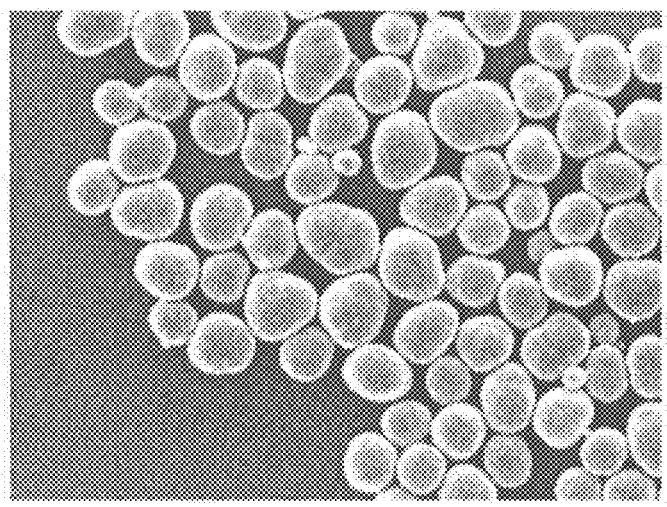
FIGS. 7A and 7B depict scanning electron microscopy images of the Example 2 Ni-rich cathode expressed as $Li_{1+\beta}(Ni_xMn_yCo_z)^{M1}{}_\alpha(Ni_xMn_yCo_z)^{M2}{}_{1-\alpha}O_2$ and having a spherical and uniform particle size having with an average size of around 12 μm. The single particle of FIG. 7B is one of the bulk particles from FIG. 7A.
Figure 7B:
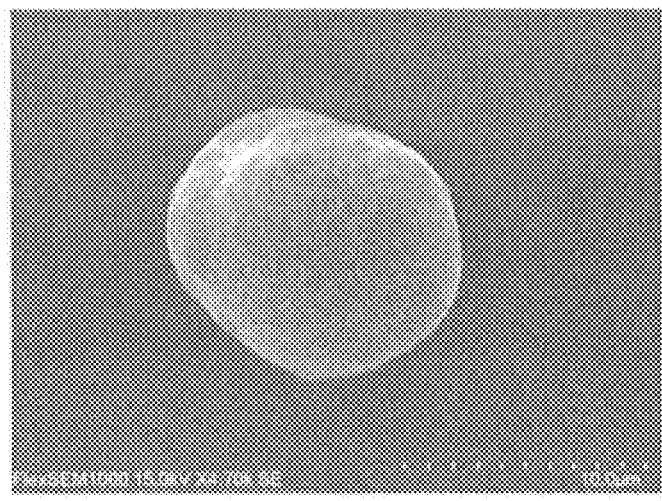

Example 6. The morphological characterization of the cathode material for Example 2. The SEM images of Example 2 are shown in FIGS. 7A and 7B. The cathode shows a similar morphology with the precursor. The particles have a uniform size with an average size of about 12 μm.

Figure 8A:
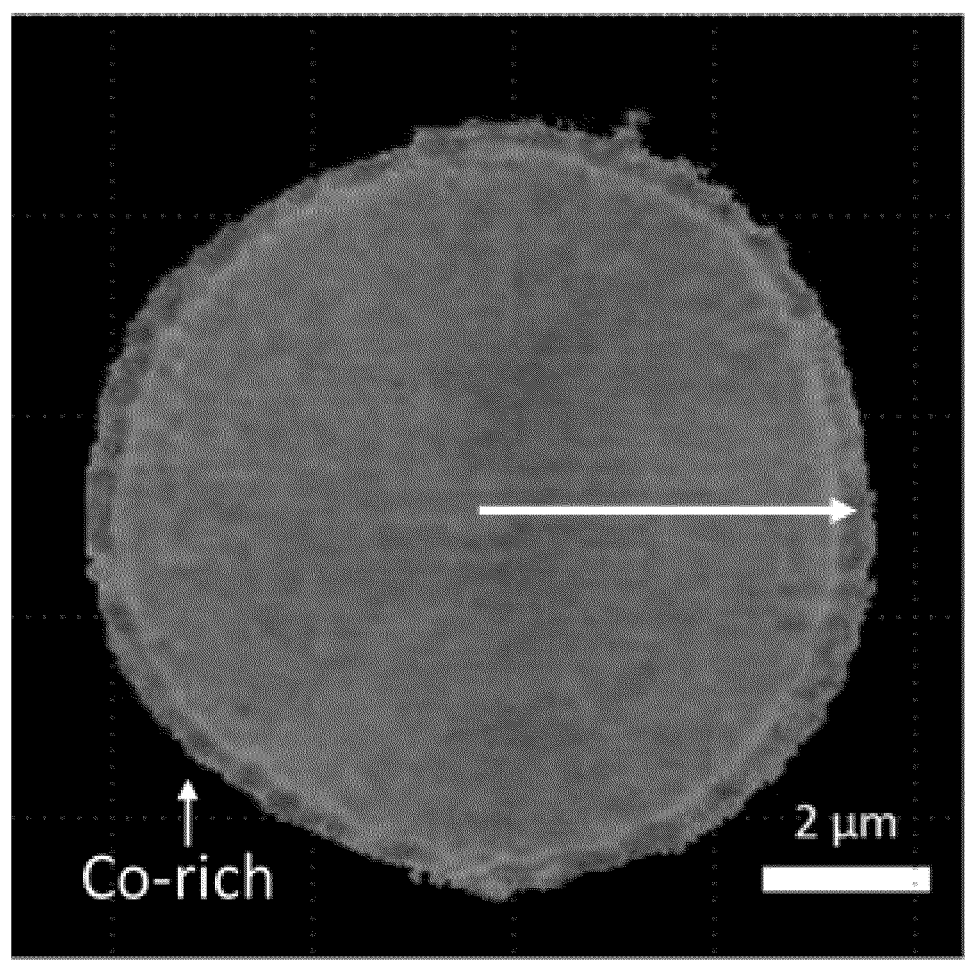
FIG. 8A depicts a synchrotron XRF (X-ray fluorescence) image confirming the formation of Ni-rich cathode material expressed as $Li_{1+\beta}(Ni_xMn_yCo_z)^{M1}{}_\alpha(Ni_xMn_yCo_z)^{M2}{}_{1-\alpha}O_2$, according to Example 2.
Figure 8B:
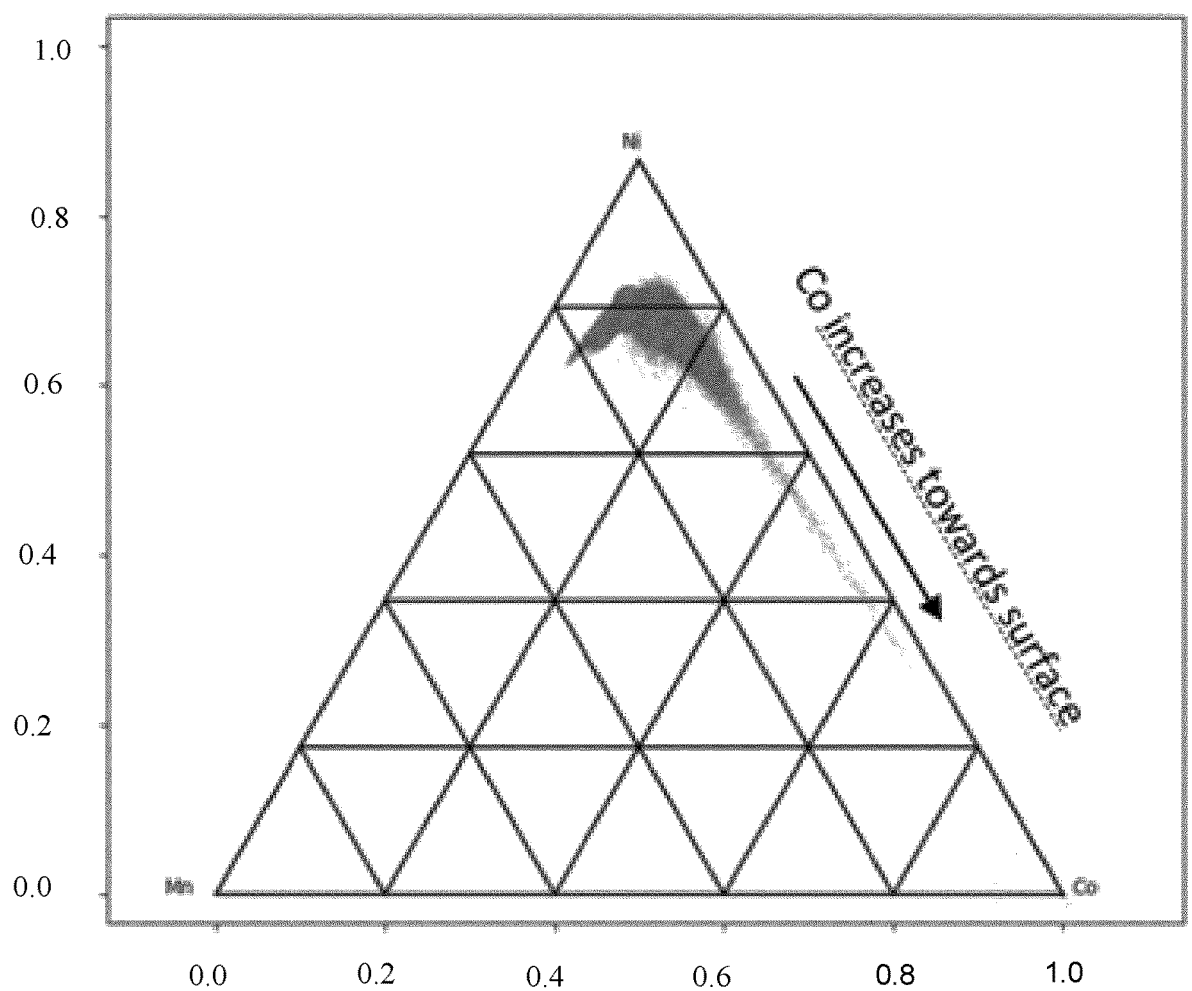
FIG. 8B is a three axis graph of the percentage material in the active material. The images show that the Ni concentration decreases from 87 mol % to 30 mol % from the core to the surface; the Mn concentration decreases from 11 mol % to 3 mol % from the core to the surface; and the Co concentration increases from 2 mol % to 70 mol % from the core to the surface.

Example 7. The composition characterization of the cathode active material of Example 2. The synchrotron X-ray fluorescence (XRF) images of Example 2 are shown in FIGS. 8A and 8B, wherein the Ni concentration decreased from 87 mol % to 30 mol % from the core to the surface; the Mn concentration decreased from 11 mol % to 3 mol % from the core to the surface; and the Co concentration increased from 2 mol % to 70 mol % from the core to the surface.

Figure 9:
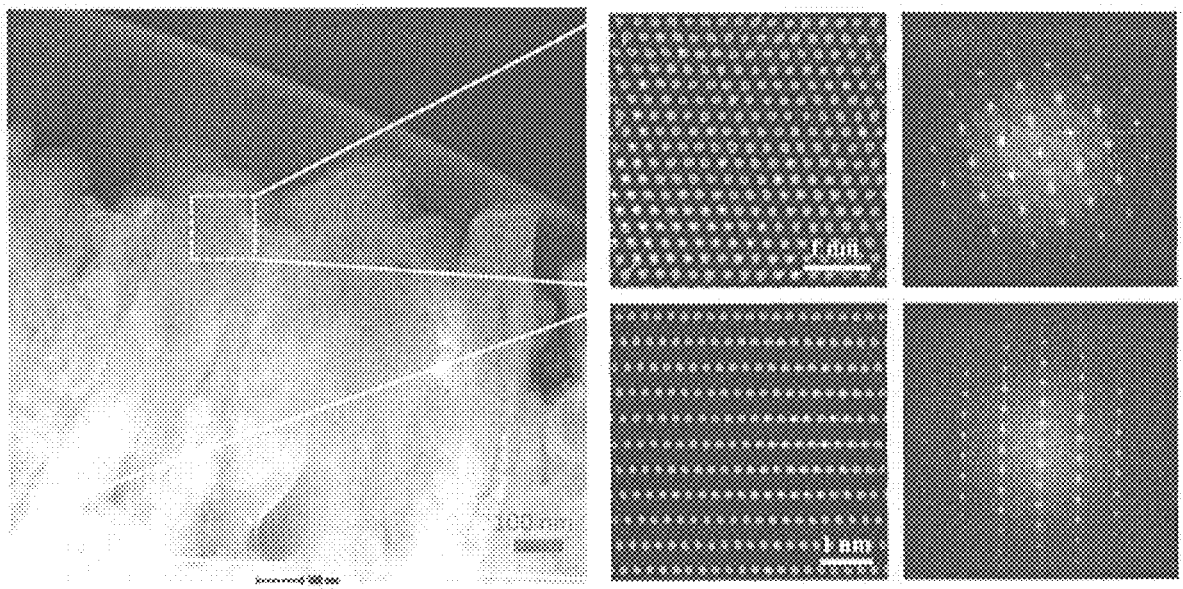
FIG. 9 depicts high resolution transmission electron microscopy (TEM) images, providing structural characterization for the Example 2 Ni-rich cathode expressed as $Li_{1+\beta}(Ni_xMn_yCo_z)^{M1}{}_\alpha(Ni_xMn_yCo_z)^{M2}{}_{1-\alpha}O_2$. The atomic structure of the core is a layered structure, and the atomic structure of the surface is a rock-salt structure.

Example 8. The structural characterization of the cathode material for Example 2. The high resolution transmission electron microscopy (TEM) images of Example 2 are shown in FIG. 9, wherein the atomic structure of the core is a layered structure, while the atomic structure of the surface is that of a rock-salt or disordered rock-salt structure.

Example 9. Illustrative batteries using $Li_{1+\beta}(Ni_xMn_yCo_z)^{M1}{}_\alpha(Ni_xMn_yCo_z)^{M2}{}_{1-\alpha}O_2$. For electrochemical testing, the cathode active material of Example 2 was mixed with carbon black and PVDF at 80:10:10 wt % ratios and ground in a mortar. The well-mixed slurry was then cast onto a sheet of aluminum foil by a doctor blade on an automatic film coater. The film was dried in a vacuum oven at 80° C. for 12 h and then transferred to a glove box filled with argon, before being punched out as circular, 14 mm in diameter, disks. 2032 type coin cells were used to prepare lithium half cells. Celgard 2325 separators and 1.2 M $LiPF_6$ in EC/EMC (3:7) (EC is ethylene carbonate; EMC is ethylmethylcarbonate) electrolyte (i.e. GEN II electrolyte) were used. The half cells were assembled in an argon-filled glovebox, and then were operated by charge/discharge cycles.

Figure 10A:
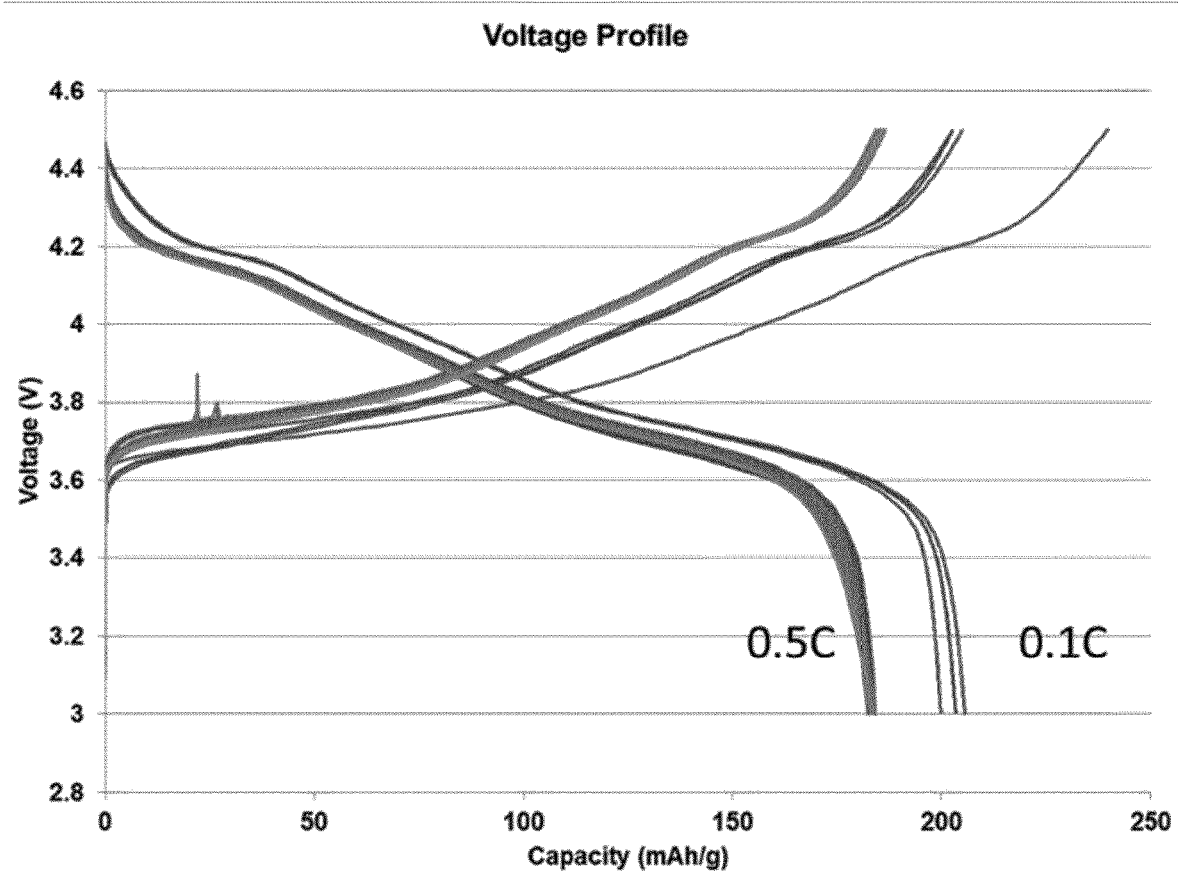
FIGS. 10A and 10B depict charge/discharge voltage profiles (10A) and cycle performance (10B) of the first 3 cycles at a charge/discharge rate of C/10 and following 50 cycles at a charge/discharge rate of C/2 at a voltage of 3.0 V to 4.5 V for the Example 2 Ni-rich cathode.
Figure 10B:
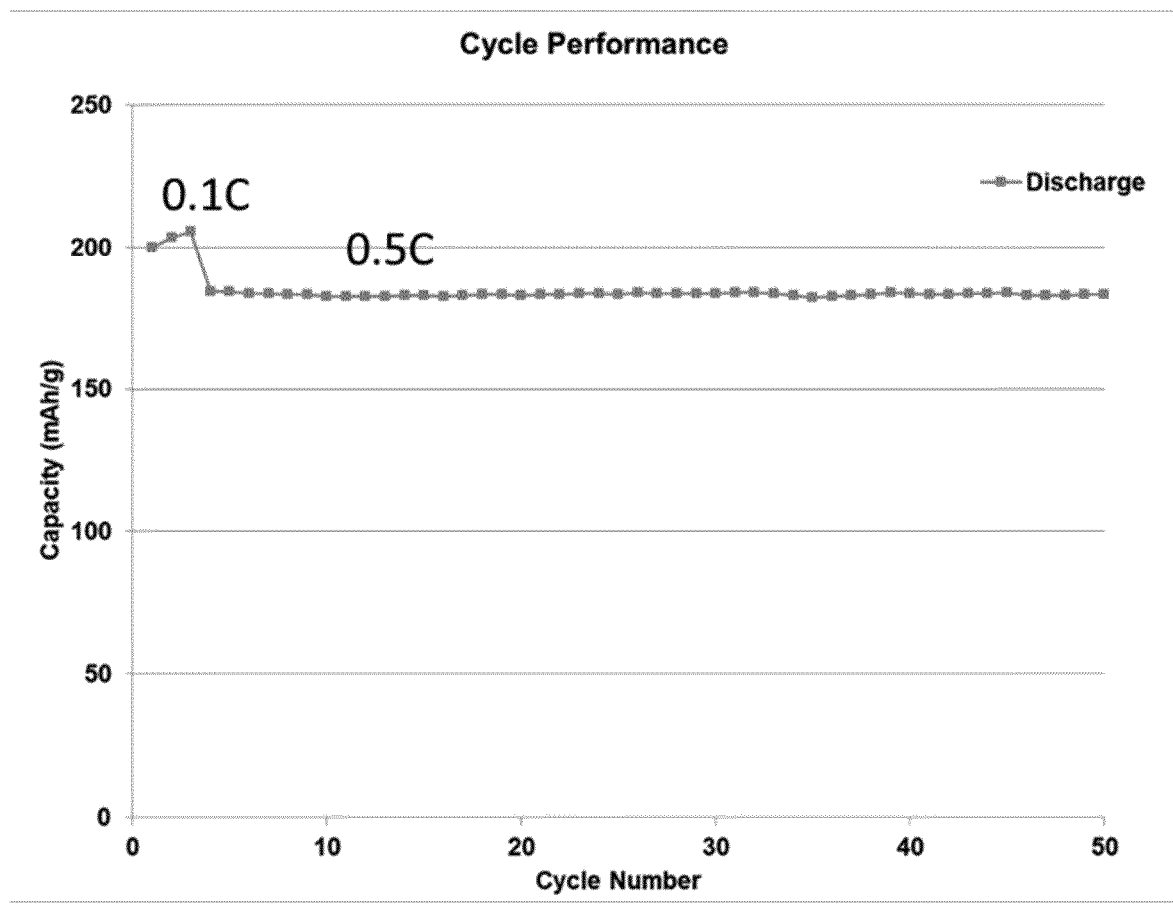

Example 10. Electrochemical properties of the cells from Example 2. FIGS. 10A and 10B depict the charge/discharge voltage profiles of the first 3 cycles at a charge/discharge rate of C/10 and following 50 cycles at a charge/discharge rate of C/2 at a voltage of 3.0 V to 4.5 V. As shown, the cathode shows a high initial specific capacity of 205 mAh $g^{-1}$ at the current rate of C/10 and an excellent capacity retention without any capacity degradation at the current rate of C/2 after 50 cycles.

Figure 11A:
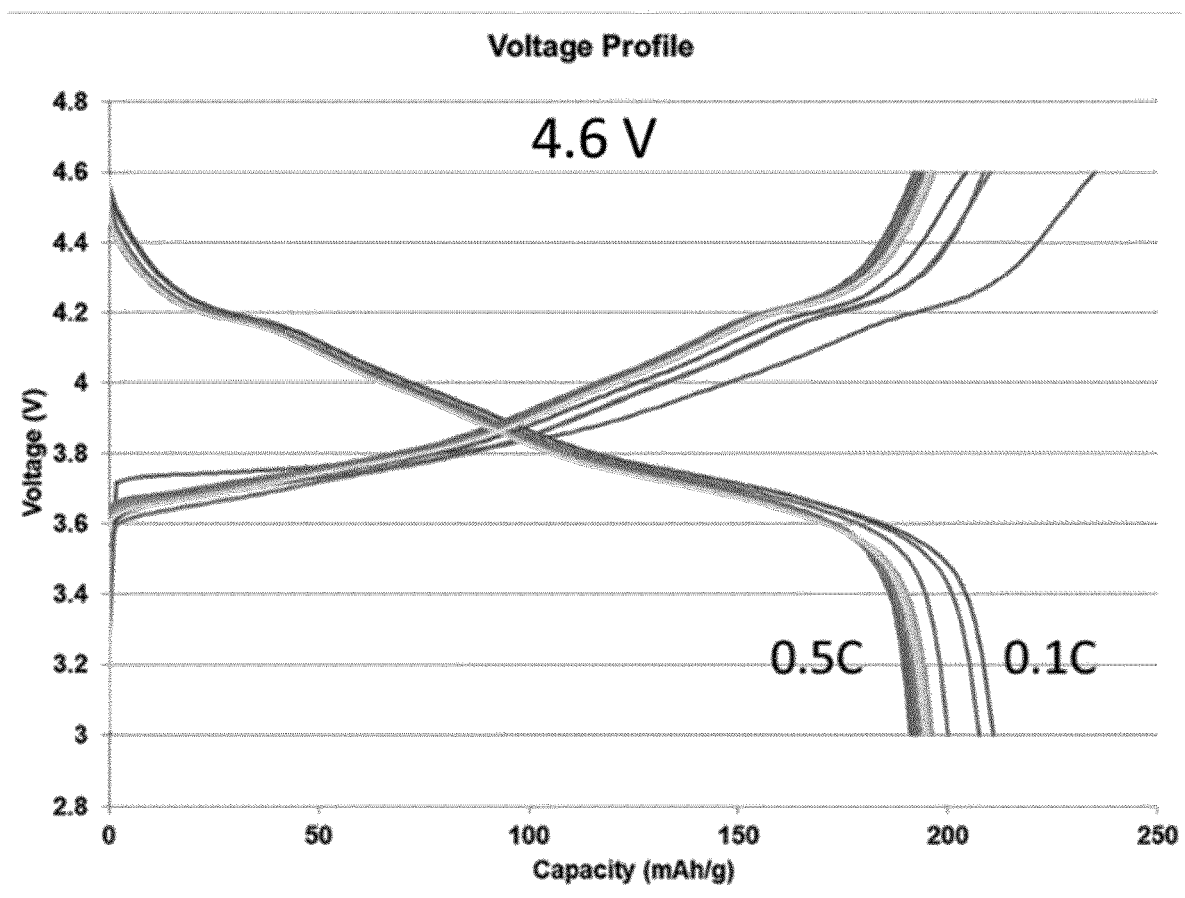
FIGS. 11A and 11B depict charge/discharge voltage (11A) and cycle performance (11B) profiles of the first 3 cycles at a charge/discharge rate of C/10 and following 35 cycles at a charge/discharge rate of C/2 at a voltage of 3.0 V to 4.6 V for the Example 2 Ni-rich cathode.
Figure 11B:
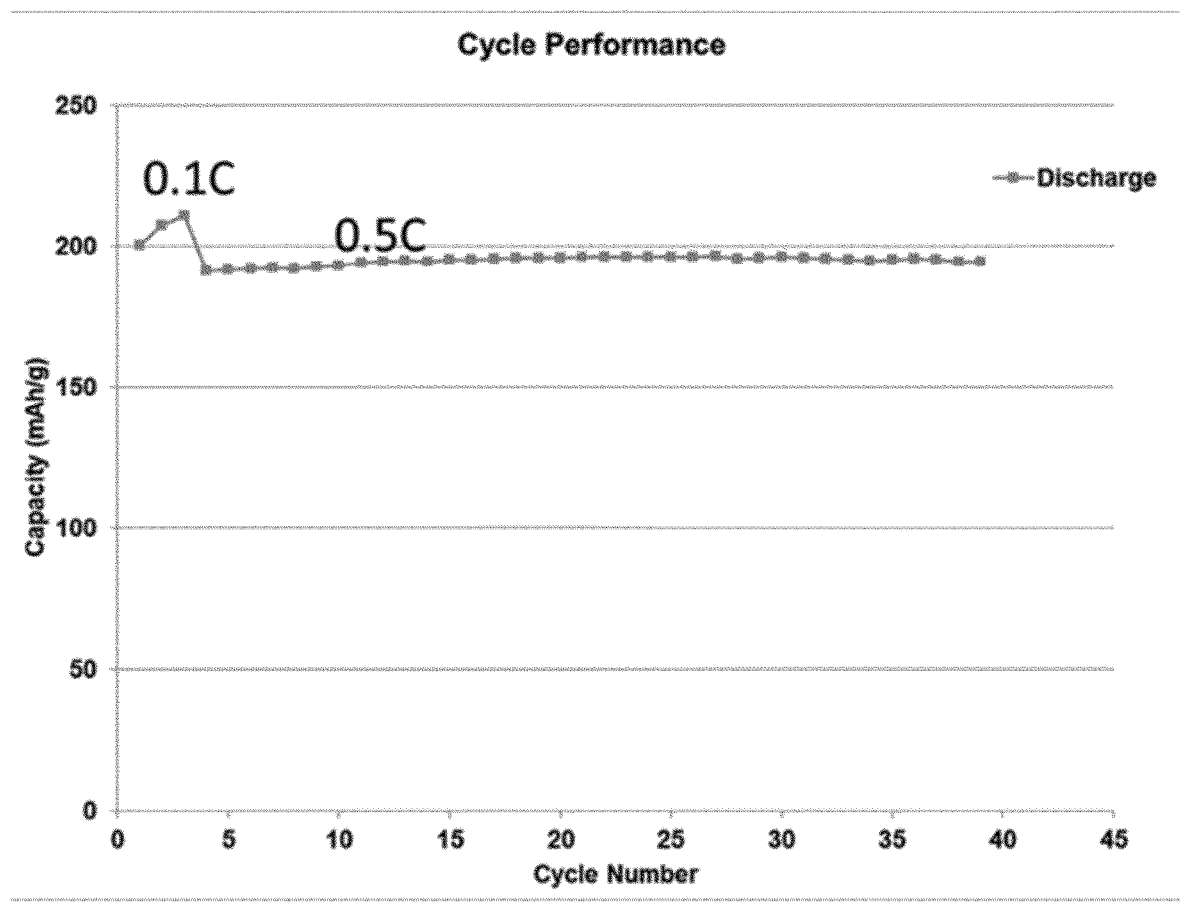

Example 11. FIGS. 11A and 11B depict the charge/discharge voltage profiles of the first 3 cycles at a charge/discharge rate of C/10 and following 35 cycles at a charge/discharge rate of C/2 at a voltage of 3.0 V to 4.6 V. As shown, the cathode shows a high initial specific capacity of 211 mAh $g^{-1}$ at the current rate of C/10 and an excellent capacity retention without any capacity degradation at the current rate of C/2 after 35 cycles.

Figure 12A:
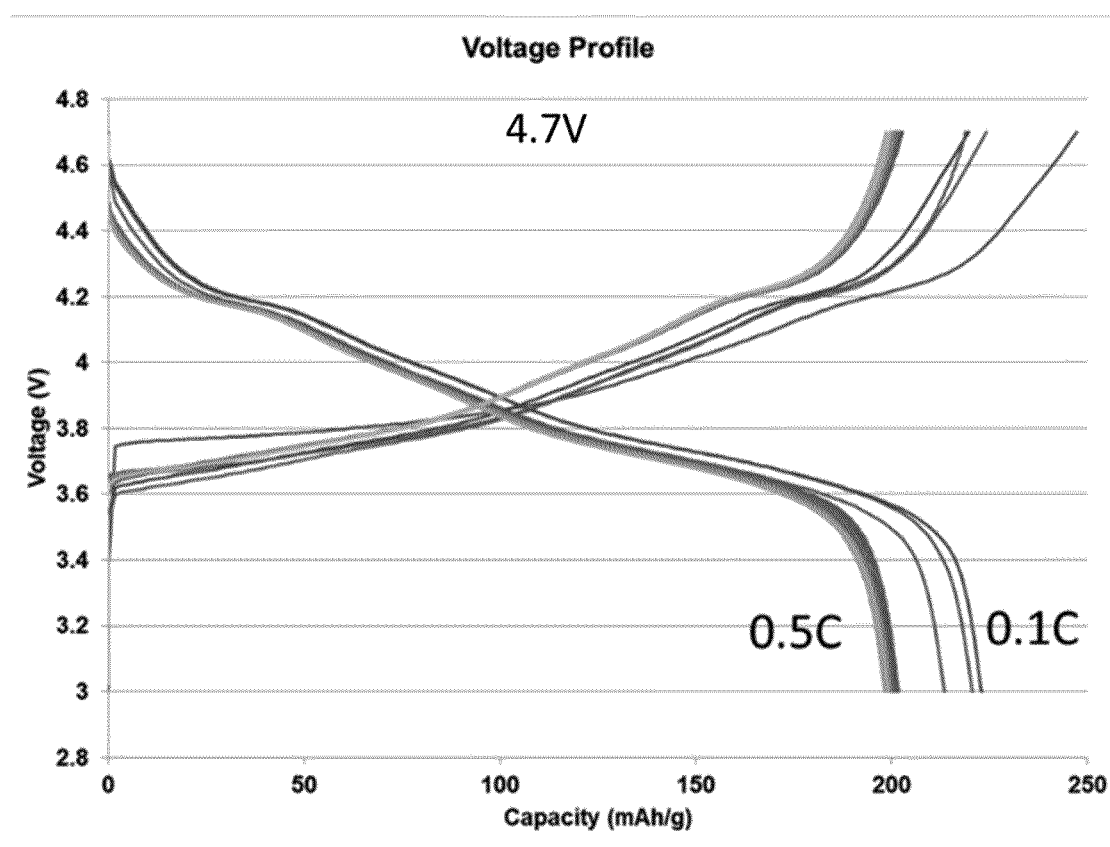
FIGS. 12A and 12B depict charge/discharge voltage (12A) and cycle performance (12B) profiles of the first 3 cycles at a charge/discharge rate of C/10 and following 30 cycles at a charge/discharge rate of C/2 at a voltage of 3.0 V to 4.7 V for the Example 2 Ni-rich cathode.
Figure 12B:
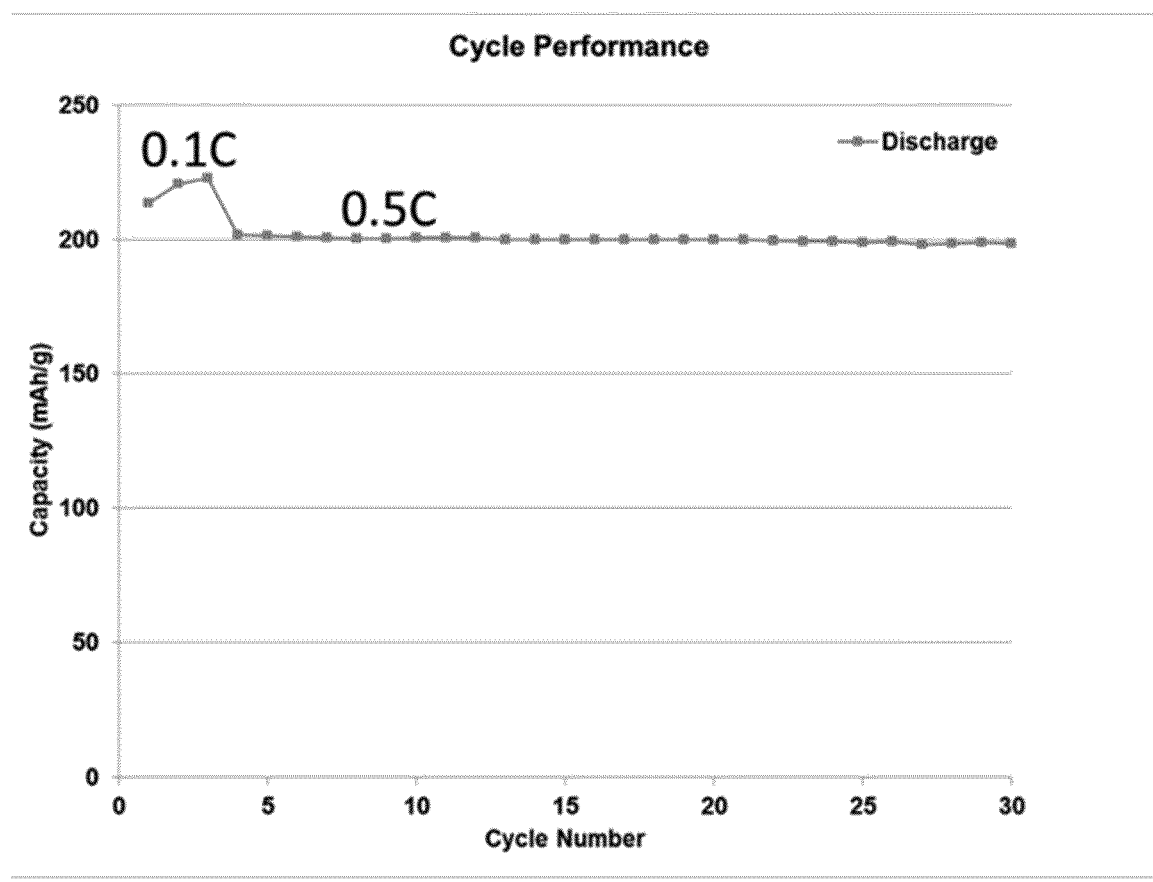

Example 12. FIGS. 12A and 12B depict the charge/discharge voltage profile for each of the first 3 cycles at a charge/discharge rate of C/10 and following 30 cycles at a charge/discharge rate of C/2 at a voltage of 3.0 V to 4.7 V. As shown, the cathode shows a high initial specific capacity of 224 mAh $g^{-1}$ at the current rate of C/10, and an excellent capacity retention of 99% at the current rate of C/2 after 30 cycles.

Figure 13A:
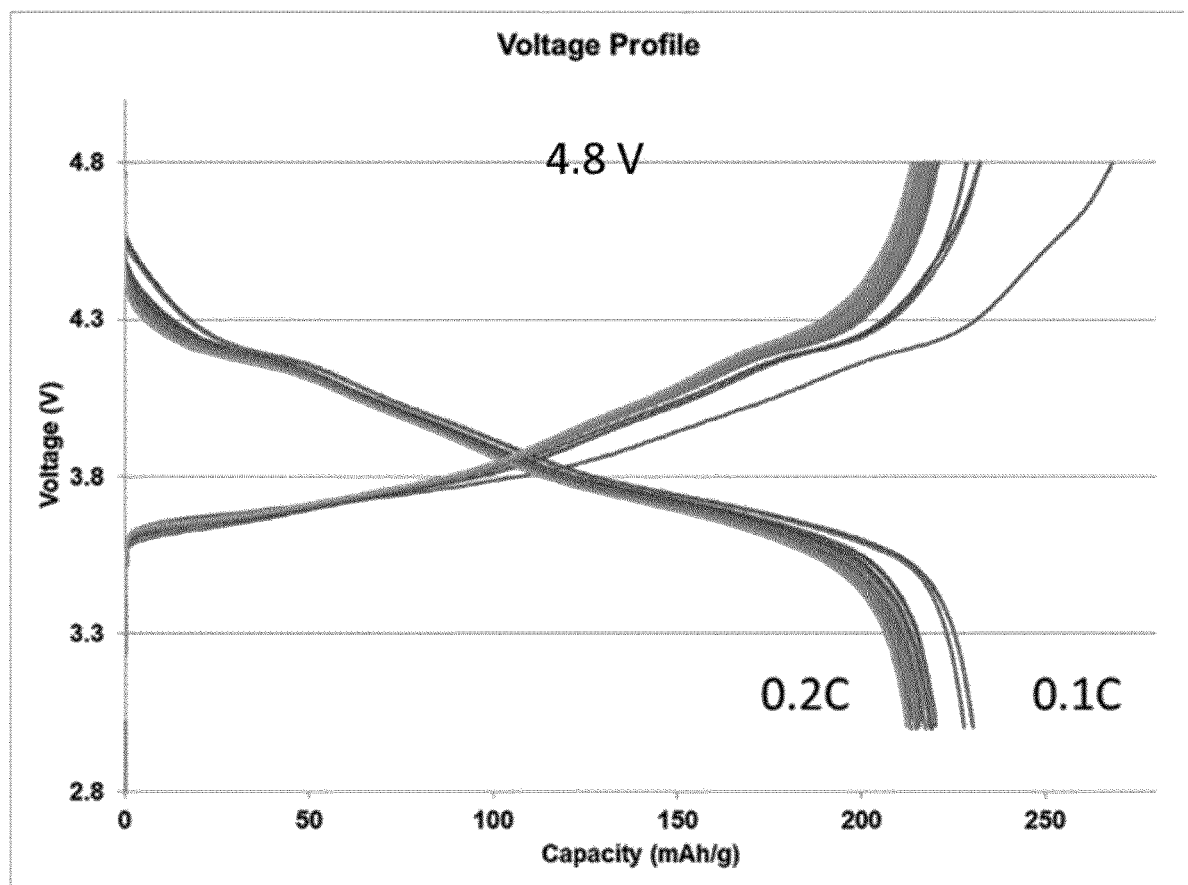
FIGS. 13A and 13B depict charge/discharge voltage (13A) and cycle performance (13B) profiles of the first 3 cycles at a charge/discharge rate of C/10 and following 30 cycles at a charge/discharge rate of C/5 at a voltage of 3.0 V to 4.8 V for the Example 2 Ni-rich cathode.
Figure 13B:
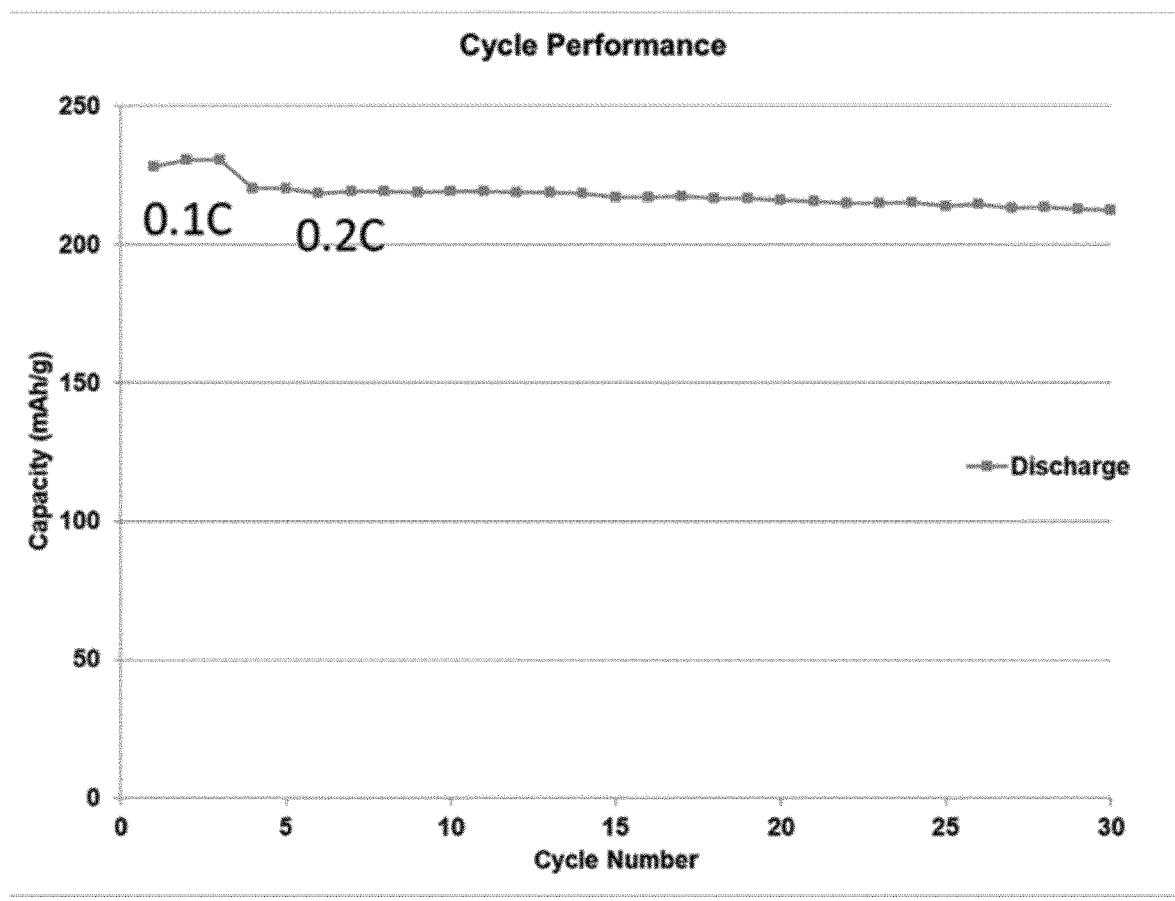

Example 13. FIGS. 13A and 13B depict the charge/discharge voltage profile of each of the first 3 cycles at a charge/discharge rate of C/10 and following 30 cycles at a charge/discharge rate of C/5 within at a voltage of 3.0 V to 4.8 V. As shown, the cathode shows a high initial specific capacity of 232 mAh $g^{-1}$ at the current rate of C/10 and an excellent capacity retention of 97% at the current rate of C/2 after 30 cycles.

Figure 14:
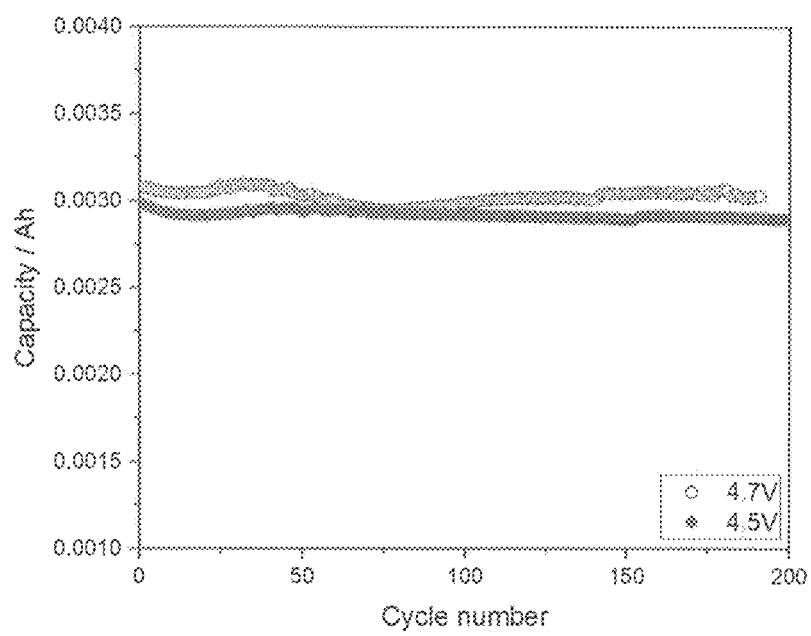
FIG. 14 depicts the full cell cycle performance of Example 2 operating at a current rate of C/2 and a cut-off potential of 4.5V and 4.7V, respectively.

Example 14. FIG. 14 depicts the full cell cycle performance of Example 2 operating at a current rate of C/2 and a cut-off potential of 4.5 V and 4.7 V, respectively. As shown, the cathode shows ultra-stable cycle performance at potentials of 4.5 V and 4.7 V. The capacity retention of the two cells is almost 100% after 200 cycles.

Figure 15:
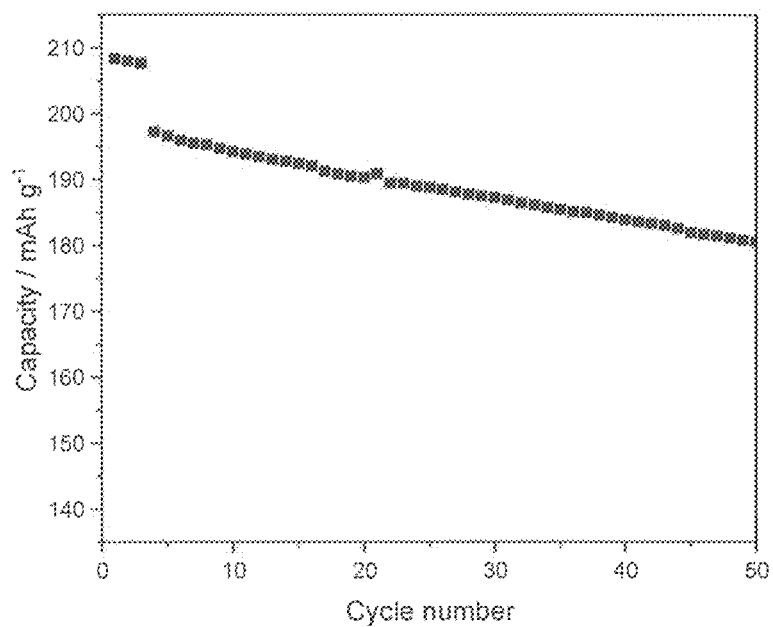
FIG. 15 depicts the cycle performance of uniform NMC811 (Ni 80 mol %, Mn 10 mol %, and Co 10 mol %) during 50 cycles at a rate of C/2 at a voltage of 3.0 V to 4.5 V.

Example 15 (comparative). FIG. 15 depicts the cycle performance of uniform NMC811 (i.e. a constant concentration cathode material—no gradient—having 80 mol % Ni, 10 mol % Mn, and 10 mol % Co) during 50 cycles at a rate of C/2 within at a voltage of 3.0 V to 4.5 V. As shown, uniform NMC811 shows a fast capacity degradation within 50 cycles.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A cathode active material comprising:
    a core portion comprising: $Li_{1+\beta}(Ni_xMn_yCo_z)^{M1}O_2$; and
    a surface portion comprising $Li_{1+\beta'}(Ni_{x'}Mn_{y'}Co_{z'})^{M2}O_2$; or
    a core portion comprising $Na_{1+\beta}(Ni_xMn_yCo_z)^{M1}O_2$; and
    a surface portion comprising $Na_{1+\beta'}(Ni_{x'}Mn_{y'}Co_{z'})^{M2}O_2$;
    wherein:
        the cathode active material comprises particles having a generally spherical morphology and a vector radius defined from a core of each particle to the surface of each particle;
        the surface composition comprises at least 50% Co;
        the structure of M2 comprises a disordered rock-salt phase;
        $0 \le x \le 1$, $0 \le y \le 0.5$, $0 \le z \le 0.4$, $0 \le x' \le 0.5$, $0 \le y' \le 0.5$, $0.5 \le z' \le 1$, $-0.1 \le \beta < 0.1$ and $-0.1 \le \beta' < 0.1$;
        the sum of x, y and z is 0.9-1.1, and the sum of x', y' and z' is 0.9-1.1;
        the Ni concentration continuously decreases along the vector radius of each particle;
        the Mn concentration continuously decreases along the vector radius of each particle; and
        the Co concentration continuously increases along the vector radius of each particle.

2. The cathode active material of claim 1, wherein $0.6 \le x \le 1$, $0 \le y \le 0.4$, $0 \le z \le 0.4$, $0 \le x' \le 0.5$, $0 \le y' \le 0.5$, and $0.6 \le z' \le 1$.

3. The cathode active material of claim 1, wherein M2 comprises from about 60 mol % to about 90 mol % Co.

4. The cathode material of claim 1, wherein the composite structure of M1 is a layered structure and/or a spinel structure nearer a central portion of the particle.

5. The cathode active material of claim 1, wherein a concentration of any metals changes by one or more slopes.

6. The cathode active material of claim 1 further comprising a dopant cation.

7. The cathode active material of claim 1 further comprising a surface coating on the particle.

8. The cathode active material of claim 7, wherein the surface coating comprises a metal oxide, a metal fluoride, a metal phosphate, a conductive carbon coating, a conductive polymer, or a combination of any two or more thereof.

9. A cathode active material comprising:
    a core portion comprising: $Li_{1+\beta}(Ni_xMn_yCo_z)^{M1}O_2$; and
    a surface portion comprising $Li_{1+\beta'}(Ni_{x'}Mn_{y'}Co_{z'})^{M2}O_2$; or
    a core portion comprising $Na_{1+\beta}(Ni_xMn_yCo_z)^{M1}O_2$; and
    a surface portion comprising $Na_{1+\beta'}(Ni_{x'}Mn_{y'}Co_{z'})^{M2}O_2$;
    wherein:
        the cathode active material comprises particles having a generally spherical morphology and a vector radius defined from a core of each particle to the surface of each particle;
        the surface composition comprises from about 60% Co to about 90 mol % Co;
        the structure of M2 comprises a disordered rock-salt phase;
        $0 \le x \le 1$, $0 \le y \le 0.5$, $0 \le z \le 0.4$, $0 \le x' \le 0.5$, $0 \le y' \le 0.5$, $0.5 \le z' \le 1$, $-0.1 \le \beta < 0.1$ and $0 < \beta' < 0.1$;
        the sum of x, y and z is 0.9-1.1, and the sum of x', y' and z' is 0.9-1.1;
        the Ni concentration continuously decreases along the vector radius of each particle;
        the Mn concentration continuously decreases along the vector radius of each particle; and
        the Co concentration continuously increases along the vector radius of each particle.

10. The cathode active material of claim 8, wherein the surface coating comprises a conductive polymer comprising poly(3,4-ethylenedioxythiophene).

* * * * *